United States Patent
Rossi (10) Patent No.: US 11,762,730 B2
(45) Date of Patent: Sep. 19, 2023

(54) SELECTION OF OUTLIER-DETECTION PROGRAMS SPECIFIC TO DATASET META-FEATURES

(71) Applicant: Adobe Inc., San Jose, CA (US)

(72) Inventor: Ryan Rossi, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 297 days.

(21) Appl. No.: 17/150,890

(22) Filed: Jan. 15, 2021

(65) Prior Publication Data

US 2022/0229721 A1    Jul. 21, 2022

(51) Int. Cl.
*G06F 11/08*     (2006.01)
*G06F 17/18*     (2006.01)
*G06N 20/00*     (2019.01)
*G06F 17/16*     (2006.01)
*G06F 18/213*    (2023.01)
*G06F 18/25*     (2023.01)

(52) U.S. Cl.
CPC .............. *G06F 11/08* (2013.01); *G06F 17/16* (2013.01); *G06F 17/18* (2013.01); *G06F 18/213* (2023.01); *G06F 18/251* (2023.01); *G06N 20/00* (2019.01)

(58) Field of Classification Search
CPC .......... G06F 11/08; G06F 17/16; G06F 17/18; G06K 9/6232; G06K 9/6289; G06N 20/00
USPC .......................................................... 714/1
See application file for complete search history.

(56) References Cited

U.S. PATENT DOCUMENTS

| | | | |
|---|---|---|---|
| 10,475,471 B2 * | 11/2019 | Ebenezer ................ | G10L 25/21 |
| 2017/0132288 A1 * | 5/2017 | Ho .......................... | G06F 40/30 |
| 2019/0130188 A1 * | 5/2019 | Zhou ..................... | G06V 10/764 |
| 2019/0304102 A1 * | 10/2019 | Chen ...................... | G06N 20/20 |
| 2020/0065612 A1 * | 2/2020 | Xu .......................... | G06K 9/629 |

OTHER PUBLICATIONS

Campos, et al., On the Evaluation of Unsupervised Outlier Detection: Measures, Datasets, and an Empirical Study, Data Mining and Knowledge Discovery, vol. 30, No. 4, Jul. 1, 2016, pp. 1-21.
Emmott, et al., Anomaly Detection Meta-Analysis Benchmarks, Dataset, 2016, pp. 1-6.

(Continued)

*Primary Examiner* — Yair Leibovich
(74) *Attorney, Agent, or Firm* — Kilpatrick Townsend & Stockton LLP (57) ABSTRACT

Embodiments described herein involve selecting outlier-detection programs that are specific to meta-features of datasets. For instance, a computing system constructs a performance vector from a U vector and a reference V matrix. Vector elements of the performance vector identify estimated performance values of various outlier-detection programs with respect to an input dataset. The U vector is generated using meta-features of the input dataset. The reference V matrix is generated from a training process in which performance values of the various outlier-detection programs with respect to training input datasets are used to obtain the reference V matrix via a UV decomposition. The computing system selects an outlier-detection program having a greater estimated performance value in the performance vector as compared to other outlier-detection programs' respective estimated performance values.

20 Claims, 4 Drawing Sheets

(56) References Cited

OTHER PUBLICATIONS

Feurer, et al., Hyperparameter Optimization, Automated Machine Learning, May 18, 2019, pp. 1-223.
Aggarwal, Outlier Analysis Springer, Data Mining, Nov. 25, 2016, 52 pages.
Breunig, et al., LOF: Identifying Density-Based Local Outliers, Proceedings of the Association for Computing Machinery SIGMOD International Conference on Management of Data, May 2000, pp. 93-104.
Goldstein, et al., Histogram-based Outlier Score (HBOS): A fast Unsupervised Anomaly Detection Algorithm, Poster and Demo Track of the 35th German Conference on Artificial Intelligence, 2012, pp. 59-63.
Kadioglu, et al., ISAC—Instance-Specific Algorithm Configuration, Proceedings of the conference on ECAI 2010: 19th European Conference on Artificial Intelligence, vol. 215, Available Online at: http://dblp.unitrier.de/db/conf/ecai/ecai2010.html#KadiogluMST10, Aug. 2010, pp. 751-756.
Liu, et al. Isolation Forest, Eighth Institute of Electrical and Electronics Engineers International Conference on Data Mining, Dec. 15-19, 2008, pp. 413-422.
Misir, et al., Alors: An Algorithm Recommender System, Preprint of Artificial Intelligence, vol. 244, Available Online at: http://dblp.uni-trier.de/db/journals/ai/ai244.html#MisirS17, 2017, pp. 291-314.
Nikolic, et al., Simple Algorithm Portfolio for SATArtificial Intelligence Review, vol. 40, No. 4, 2013, 10 pages.
Pevny, Loda: Lightweight On-Line Detector of Anomalies, Machine Learning, vol. 102, No. 2, 2016, pp. 275-304.
Shyu, et al., A Novel Anomaly Detection Scheme Based on Principal Component Classifier, ICDM Foundation and New Direction of Data Mining Workshop, 2003, pp. 172-179.
Smith, Cyclical Learning Rates for Training Neural Networks, Institute of Electrical and Electronics Engineers Winter Conference on Applications of Computer Vision (WACV), Mar. 24-31, 2017, 10 pages.
Vanschoren, Meta-Learning: A Survey, Available Online at: http://dblp.uni-trier.de/db/journals/corr/corr1810.html#abs-1810-03548, Oct. 8, 2018, 29 pages.
Wolpert, et al., No Free Lunch Theorems for Optimization Institute of Electrical and Electronics Engineers Transactions on Evolutionary Computation, vol. 1, No. 1, Available Online at: http://dblp.unitrier.de/db/journals/tec/tec1.html#DolpertM97, Apr. 1997, pp. 67-82.
Xu, et al. SATzilla2012: Improved Algorithm Selection Based on Cost-sensitive Classification Models Proceedings of SAT Challenge, 2012, pp. 57-58.
Yang, et al., On Hyperparameter Optimization of Machine Learning Algorithms: Theory and Practice, Neurocomputing, Available Online at: arXiv preprint arXiv:2007.15745, Aug. 20, 2020, 69 pages.
Zheng, et al., Initialization Enhancer for Non-Negative Matrix Factorization, Engineering Applications of Artificial Intelligence, vol. 20, No. 1, Feb. 2007, pp. 101-110.

* cited by examiner

SELECTION OF OUTLIER-DETECTION PROGRAMS SPECIFIC TO DATASET META-FEATURES

TECHNICAL FIELD

This disclosure relates generally to computer-implemented methods and systems for applying anomaly detection. More specifically, but not by way of limitation, this disclosure relates to selecting outlier-detection programs that are specific to meta-features of datasets.

BACKGROUND

Software tools often generate large datasets. For instance, when online computing services are used via networked computing environments, interactions with the online computing services generate large amounts of data that indicate various characteristics regarding the use of these online computing services. For example, various electronic interactions via online computing services (e.g., page views, website visits, webpage reloads) automatically generate data describing these actions (e.g., numbers of page views or website visits for each day of a given time period). Analysis of this data can identify issues that impact the ability of the online computing service to provide end-user experiences of sufficient quality, reliability, or both.

Software tools often capture large volumes of such data, resulting in the presence of anomalies or other outliers in the data. An example of an anomaly is an outlier or group of outliers in a dataset that has a statistically significant deviation from a majority distribution. Outlier-detection tools can be applied to a dataset to identify data points or trends that do not conform to expected or normal trends. In some cases, these outlier-detection tools are applied to machine-generated event log data (e.g., network logs) to detect, for example, changes in effectiveness for a given online computing service (e.g., network disruptions), responsiveness of end users to certain online content, indications of malware or other suspicious activity, or any other metric indicating a performance level associated with an online computing service. In other cases, these outlier-detection tools are applied to training datasets used in machine-learning environments, which allows anomalies or other outliers that might negatively impact a machine-learning model to be excluded from a dataset.

Many different types of outlier-detection programs have been developed over the last few decades, with no universal detector that optimizes performance regardless of the characteristics of the dataset to which the detector is applied. Conventional systems for outlier detection involve a user manually selecting, from a set of outlier-detection programs, a suitable outlier-detection program for a newly encountered dataset. To appropriately select an outlier-detection program that will provide the best performance for a given dataset, the user must already know a subset of outliers in the new dataset for evaluation of the available outlier-detection programs, which requires at least some of the data entries in the dataset to be labeled as outliers.

But having such labeled datasets available for selection of an outlier-detection program is rare. One possible approach for selecting an outlier-detection program suitable for a set of unlabeled data is to manually apply and evaluate many outlier-detection programs to the dataset, and then select the highest performing outlier-detection program. This approach, however, is computationally expensive, especially for the types of large datasets in which a software-based outlier-detection process is necessary.

Alternatively, an analyst could manually label at least some outliers in the new dataset for evaluation of different outlier-detection programs, and then apply and evaluate those outlier-detection programs using the manually labeled outliers. But this approach is time-consuming, noisy, and costly in terms of the manual effort required for each new dataset that arrives or is of interest to the user. And this approach is also computationally expensive, as it requires executing each of the outlier-detection programs to determine the best one for a new dataset of interest. Furthermore, if the dataset of interest changes frequently over time, such as a dataset measuring interactions with large-scale online computing service, the characteristics of the dataset that make a particular outlier-detection program suitable at a first point in time may change so extensively that the outlier-detection program is no longer suitable at a second point in time. Thus, existing computing environments that rely on outlier detection for datasets involve significant computational expenses, such as expenditures of resources on applying many outlier-detection programs to a dataset, while still being limited in their utility, such as requiring manual analysis and labeling of outliers to find a suitable outlier detector.

SUMMARY

Embodiments described herein involve selecting outlier-detection programs that are specific to meta-features of datasets. In one example, a computing system accesses an input dataset and a reference V matrix. The reference V matrix is generated from a UV decomposition of a performance matrix having matrix elements that identify performance values of a set of outlier-detection programs with respect to training input datasets. The computing system generates a meta-feature vector representing meta-features from the input dataset and converts the meta-feature vector into a U embedding vector having a dimensionality suitable for multiplication with the reference V matrix. The computing system constructs, from the U embedding vector and the reference V matrix, a performance vector. Vector elements of the performance vector identify estimated performance values of the set of outlier-detection programs with respect to the input dataset. The computing system selects an outlier-detection program having a greater estimated performance value in the performance vector as compared to other outlier-detection programs' respective estimated performance values. The computing system performs the selected outlier-detection program on the input dataset.

Another example involves a training process for building a model that can evaluate outlier-detection programs in the manner described above. For instance, a computing system accesses training input datasets and a set of outlier-detection programs. The computing system generates a performance matrix by performing each outlier-detection program on the training input datasets. Matrix elements of the performance matrix identify performance values of the set of outlier-detection programs with respect to the training input datasets. The computing system also generates training meta-feature vectors representing meta-features of the training input datasets. The computing system performs, based on the training meta-feature vectors, a UV decomposition of the performance matrix and outputs a reference V matrix from the UV decomposition. The reference V matrix is usable for generating a performance vector from a combination of a test input dataset and the reference V matrix, where the performance vector is further usable for selecting one of the outlier-detection programs for outlier detection within the test input dataset.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Certain embodiments involve selecting outlier-detection programs that are specific to meta-features of datasets. For instance, a detector-selection program generates, for a dataset that lacks labels identifying anomalies or other outliers in the dataset, a feature vector representing meta-features characterizing the dataset, such as statistical properties of the underlying dataset. The detector-selection program generates, based on the feature vector and a pre-computed performance matrix for various outlier-detection programs, a set of estimated performance values for the outlier-detection programs. The detector-selection program identifies an outlier-detection program having a sufficiently high estimated performance with respect to the dataset. By doing so, the detector-selection program automatically identifies an outlier detector suitable for the characteristics of the dataset in a manner that reduces or eliminates the computational complexity or manual effort involved in conventional techniques for selecting outlier detectors.

The following non-limiting example is provided to introduce certain embodiments. In this example, a computing system accesses an input dataset. For instance, such an input dataset $X_{test}$ could include metrics data describing the usage or performance of a web-based system for providing access to different functions or content to end users over data networks, with metrics including page views, website visits, usage of different tools within the web-based systems, etc. The computing system is capable of executing various different outlier-detection programs for input datasets, where the characteristics of a given input dataset could make a particular one of the outlier-detection programs more suitable for detecting outliers. However, since the input dataset $X_{test}$ involves a large amount of automatically captured data, the input dataset $X_{test}$ lacks labels identifying any particular data entries as outliers that could be used to assist a user with selecting the most suitable outlier-detection program.

To address this issue, the computing system executes a detector-selection program that selects or suggests one or more of the outlier-detection programs based on features of the input dataset $X_{test}$. For instance, the computing system uses a set of functions to determine an embedding vector $U_{test}$ from meta-features $M_{test}$ of the $X_{test}$. The meta-features include characteristic dataset features that capture the outlying properties within a dataset. For instance, the computing system could extract meta-features such as statistical features, which include statistical properties (e.g., minimum, maximum, variance, skewness, covariance, etc.) of the underlying distribution of data of features and feature combinations within the input dataset, and landmarker features, which indicate outlying characteristics of a dataset.

Continuing with this example, the computing system generates a performance vector $p_{test}$. To do so, the computing system multiplies the embedding vector $U_{test}$ by a transpose of reference matrix V. The reference matrix V is generated, during a training process, from a UV decomposition of a performance matrix that identifies how well the available outlier-detection programs perform on a training corpus of input datasets having different meta-features. The performance vector $p_{test}$ has vector elements that indicate the estimated performance of the available outlier-detection programs on the input dataset $X_{test}$. For instance, the vector elements could be estimated performance values, such as average precision values, of the different outlier-detection programs. The computing system identifies the entry in $p_{test}$ that has the highest value (i.e., highest performance value for the $X_{test}$ having the meta-features $M_{test}$), and selects the outlier-detection program corresponding to the identified entry.

Certain embodiments described herein provide improvements to computing systems and tools. As explained above, software tools often capture metrics data automatically, resulting in large volumes of unlabeled data. Anomalies or other outliers in such data often cannot be identified without computationally expensive procedures (e.g., testing multiple outlier-detection programs), extensive manual effort, or both. These issues decrease the utility of software tools that rely on detecting outliers in large volumes of data, such as development environments for building machine-learning programs, analytical software for identifying performance levels associated with an online computing services, network-protection tools for detecting network intrusions or malware, etc. Detector-selection programs that implement one or more embodiments described herein can address these issues.

For instance, embodiments described herein can improve the way in which computing systems operate by, for example, using a reference V matrix, which is developed leveraging performance data from a large collection of training datasets and outlier detection programs, to learn of meta-features of one or more input datasets in an unsupervised manner. These embodiments allow for selecting an outlier-detection program in a single-shot process, in a detector-selection program avoids or reduces computationally extensive evaluations on an input dataset are avoided or reduced. This single-shot process involves the detector-selection program using the meta-features of an input dataset and a pre-computed reference V matrix to generate a set of estimated performance values for available outlier-detection programs, which allows a computing system to focus on one or more outlier-detection programs with higher performance values rather than expending resources on testing a larger set of outlier-detection programs on the input dataset. This approach can accurately predict a higher-performing outlier-detection program while also being fast and efficient at runtime (e.g., taking only a fraction of the time that it would take to evaluate the performance of even a single outlier-detection program on the input dataset).

Additionally or alternatively, improving the accuracy or computational efficiency of selecting an outlier-detection program can improve the utility of software tools that rely on detection of anomalies or algorithms. For instance, a detector-selection program, as described herein, applies a particular set of rules that involve extracting meta-features of an unlabeled input dataset and thereby generating a U matrix, as well as constructing a vector of estimated performance values from the U matrix and a reference V matrix and using the vector to select a suitable outlier-detection program for that dataset. By providing this capability, in which suitable outlier-detection programs are selected more accurately and/or more efficiently, certain embodiments described herein improve the technical feasibility of using an unlabeled input dataset for eliminating anomalies when building machine-learning models in software development environments, for identifying more significant trends when evaluating the performance of online computing environments, for detecting anomalous behavior indicative of network attacks, or for performing other software operations with respect to outliers in large datasets. Thus, the rules applied by the detector-selection programs described herein improve the utility, performance, or both of software tools that utilize datasets having outliers or anomalies.

Figure 1:
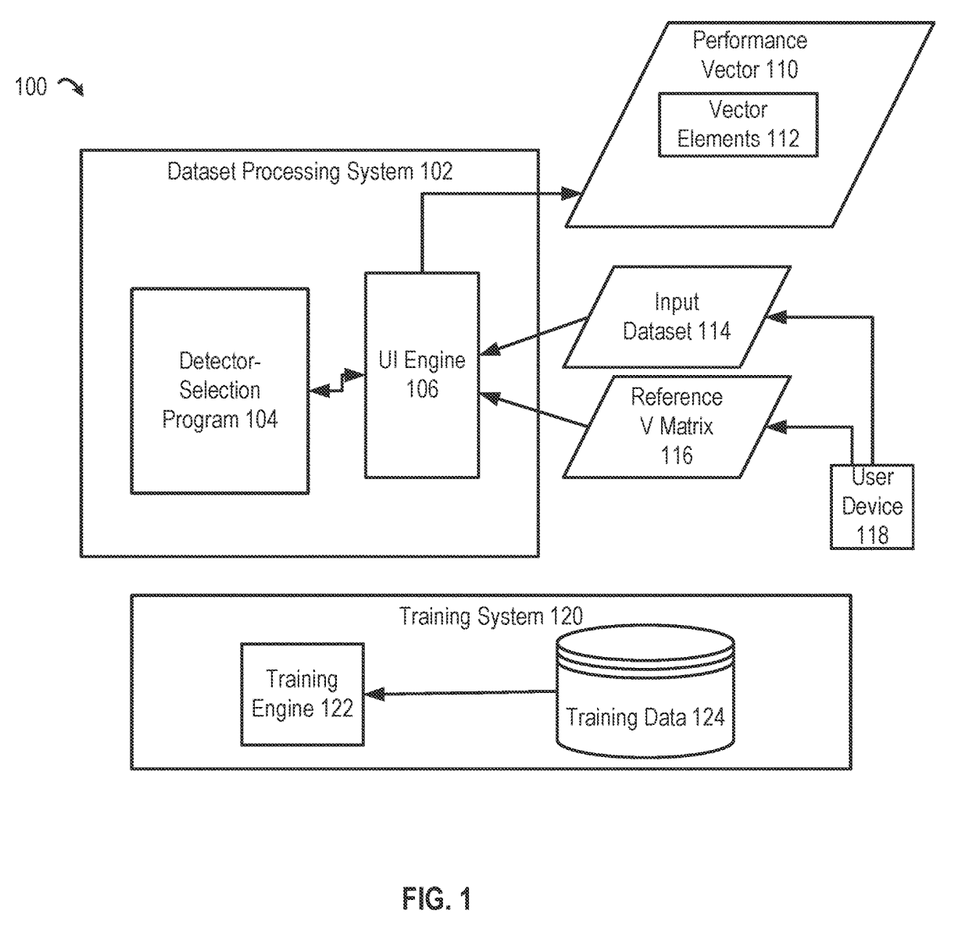
FIG. 1 depicts an example of a computing environment for configuring and using a detector-selection program that selects outlier detectors specific to meta-features of input datasets, in accordance with certain embodiments described in the present disclosure.

Example of an Operating Environment for Selection of Outlier-Detection Programs Specific to Meta Features of Datasets Referring now to the drawings, FIG. 1 depicts an example of a computing environment 100 for configuring and using a detector-selection program that selects outlier detectors specific to meta-features of input datasets. In various embodiments, the computing environment 100 includes one or more of a dataset-processing system 102 and a training system 120.

The dataset-processing system 102 includes one or more computing devices that execute program code providing a dataset-processing software tool. The dataset-processing system 102, as illustrated in FIG. 1, includes a detector-selection program 104 and a user interface engine 106.

The dataset-processing system 102 uses the detector-selection program 104 to compute estimated performance values of a set of outlier-detection programs for the input dataset. In some embodiments, the detector-selection program 104 executes a meta-learning algorithm that generates a performance vector for an input dataset. For instance, the dataset-processing system 102 accesses, as an input, an input dataset 114 that is provided by a user device 118 or otherwise identified using a user device 118. The input dataset 114 lacks labels or other metadata identifying entries in the input dataset 114 as anomalies or other outliers.

The dataset-processing system 102 executes the detector-selection program 104 to identify an outlier-detection program that is suitable for the input dataset 114. To do so, the detector-selection program 104 accesses, as an input, a reference V matrix 116. The reference V matrix 116 is generated from a UV decomposition of a performance matrix. Elements of the performance matrix identify performance values of a set of outlier-detection programs with respect to training input datasets. An outlier-detection program is a software tool or other set of program code that implements an outlier detection method or model. The detector-selection program 104 generates a meta-feature vector representing meta-features from the input dataset 114. The detector-selection program 104 also converts the meta-feature vector into a U embedding vector that has a dimensionality suitable for multiplication with the reference V matrix 116. The outputs of the detector-selection program 104 identify estimated performance values of the set of outlier-detection programs for the input dataset.

The dataset-processing system 102 computes and outputs a performance vector 110. The performance vector 110 includes vector elements that identify estimated performance values of the set of outlier-detection programs with respect to the input dataset 114. For instance, the performance vector 110 could include vector elements 112 that are estimated performance values for different outlier-detection programs, respectively. Vector elements identifying larger estimated performance values can correspond to outlier-detection programs that may exhibit better performance for the input dataset 114. For instance, an outlier-detection program could have better performance if it more accurately or precisely identifies anomalies or outliers in a dataset as compared to other outlier-detection programs.

Such performance vectors have many uses across various domains and downstream tasks. For instance, an outlier-detection program can be selected and performed for the input dataset 114. An outlier-detection program with a performance value that is greater than other estimated performance values in the performance vector can be selected. The outlier-detection program can then be performed on the input dataset. The performance vector can allow an outlier-detection program to be selected without knowledge of a type of outlier in the input dataset 114.

In some embodiments, the training system 120 facilitates training of various models used by the detector-selection program 104. As illustrated in FIG. 1, the training system 120 includes a training engine 122 and training data 124. In some embodiments, the training engine 122 takes the training data 124 as an input and outputs a trained detector-selection program relating to the training data 124. For example, the training data 124 includes dataset inputs and outlier-detection program inputs. This training data 124 is input into the training engine 122, and the training engine 122 generates a performance matrix that includes matrix elements that identify performance values of the outlier-detection program inputs with respect to the dataset inputs. The training engine 122 generates the performance matrix by performing each outlier-detection program on the input datasets. The training engine 122 performs a UV decomposition of the performance matrix based on training meta-feature vectors representing meta-features of the input datasets. The training engine 122 generates a reference V matrix from the UV matrix decomposition. The training system 120 provides the detector-selection program 104, with one or more trained models, along with the reference V matrix, to the dataset-processing system 102. Examples of training the detector-selection program 104 are described herein with respect to FIG. 2.

In various embodiments, the detector-selection program 104 executes different functions for generating a U embedding vector. For instance, the detector-selection program 104 executes an extractor function to generate a vector $M_{test}$ from an input dataset $X_{test}$, where $M_{test}$ represents meta-features of the input dataset. The detector-selection program 104 also executes an embedding function that projects $M_{test}$ into a feature space having a lower dimensionality than $M_{test}$. The embedding function projects extracted meta-features for differently sized input datasets into a common feature space. In an illustrative example, the extractor embeds first meta-features of a first matrix and second meta-features of a second matrix into a feature space having k dimensions. The first matrix represents a first input dataset using a first number of rows and a first number of columns, and the second matrix represents a second input dataset using a second number of rows and a second number of columns. By embedding the meta-features extracted from these matrices having different dimensions into the same feature space, the detector-selection program 104 can treat different input datasets with similar underlying meta-features in a similar manner. For instance, the detector-selection program 104 could select the same outlier-detection program for both of the two input datasets discussed above if the two input datasets have similar embeddings for their meta-features, even if the similarities in the input datasets not readily apparent from their differently sized matrices.

In some embodiments, the detector-selection program 104 also executes a regressor function that generates $U_{test}$ from the embedding of $M_{test}$. The regressor function is configured to regress a k-dimensional embedding of a meta-feature vector into a vector $U_{test}$, corresponding to an optimized matrix V obtained from a UV decomposition of a performance matrix P. For instance, in a training process, a training engine 122 accesses training input datasets and the set of outlier-detection programs. The training engine 122 applies each outlier-detection program to each training input dataset and computes a performance value of that outlier-detection program with respect to each dataset. The training engine 122 stores the computed performance values in a performance matrix P, where $P_{ij}$ is the performance of outlier-detection program i on training input dataset j. The training engine 122 uses the performance matrix P to compute the reference matrix V. For instance, the training engine 122 computes the optimized matrix V by finding a matrix U and the matrix V that, when multiplied, most closely reproduce the performance matrix P. The training engine 122 uses the matrix U to train the regressor. For instance, the training engine 122 finds the parameter values of the regressor that generate the matrix U by regressing a set of meta-features extracted from the training input datasets.

The dataset-processing system 102 communicates with a user device 118 via a user interface engine 106. The user interface engine 106 executes program code that provides a graphical interface to a user device 118 for display. The user interface engine 106 also executes program code that receives input, such as the input dataset 114, via a graphical interface and provides the input to the detector-selection program 104. The user interface engine 106 also executes program code that generates outputs, such as visual indicators of the vector elements 112. For instance, the user interface engine 106 could use the vector elements 112 to generate a visual indicator (e.g., color) for an outlier-detection program with a performance value that is greater than other estimated performance values included in the performance vector 110. The user interface engine 106 updates the graphical interface to include these or other visual indicators of the vector elements 112.

The user interface engine 106 includes one or more elements for identifying the input dataset 114 to the dataset-processing system 102. In one example, the user interface engine 106 provides a graphical interface with an input element configured for uploading the input dataset from a memory device on the user device 118 to the dataset-processing system 102. In another example, the user interface engine 106 provides a graphical interface with an input element configured for identifying a location, such as a web link or other network or memory address, from which the dataset-processing system 102 can retrieve the input dataset.

Figure 2:
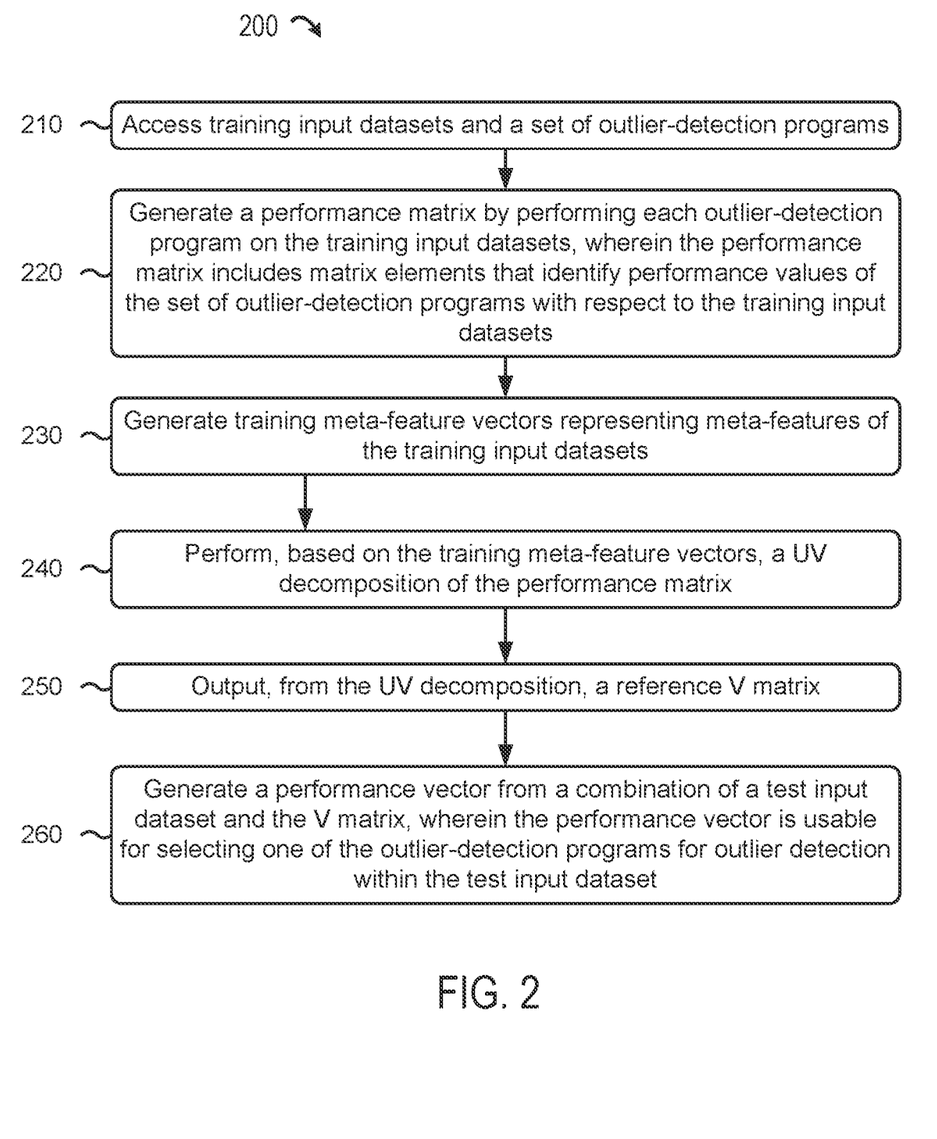
FIG. 2 depicts an example of a process for training a detector-selection program to generate a performance vector usable or selecting an outlier-detection program based on the meta-features of an input dataset, in accordance with certain embodiments described in the present disclosure.

Example of Operations for Training and Using a Model to Select Outlier-Detection Programs Specific to Meta Features of Datasets FIG. 2 depicts an example of a process 200 for training a detector-selection program to generate a performance vector usable or selecting an outlier-detection program based on the meta-features of an input dataset. One or more operations described herein with respect to the process 200 can be used to implement a step for using a performance vector to select an outlier-detection program based on meta-features of an input dataset. In some embodiments, one or more computing devices implement operations depicted in FIG. 2 by executing suitable program code (e.g., code implementing the training engine 122). For illustrative purposes, the process 200 is described with reference to certain examples depicted in the figures. Other implementations, however, are possible.

At block 210, the process 200 involves the training engine 122 accessing training input datasets and a set of outlier-detection programs. For example, training data 124 could include the training input datasets and the set of outlier-detection programs. The training engine 122 accesses the training input datasets and the set of outlier-detection programs by retrieving the training data 124 from a memory device. The training input datasets can include ground truth labels for whether a data point is an outlier or not.

At block 220, the process 200 involves the training engine 122 generating a performance matrix (P). The training engine 122 generates the performance matrix by performing each outlier-detection program on the training input datasets. The performance matrix includes matrix elements, such as performance values, that indicate performance levels of different outlier-detection programs with respect to the training input datasets. For instance, in a performance matrix P, a matrix element $P_{ij}$ is the performance of an outlier-detection program j on a training input dataset i. In one example, the performance matrix P could include performance values computed from using average precision. But any suitable performance metric could be used to populate the performance matrix P.

At block 230, the process 200 involves the training engine 122 generating training meta-feature vectors that represent meta-features of the training input datasets. Meta-features are characteristics of a dataset that are usable for characterizing similarities between datasets. For example, the meta-features can include statistical features (e.g., minimum, maximum, variance, skewness, covariance, etc.), landmark features capturing the outlying characteristics of a training input dataset, or any other features suitable for characterizing a dataset.

In embodiments involving meta-features that include landmark features, the training engine 122 generates landmark features using an algorithm such as iForest, histogram-based outlier score, lightweight online detector of anomalies ("LODA"), or principal component analysis ("PCA"). In one example, iForest creates a set of randomized trees that define the model structure from which structural features, such as average horizontal and vertical tree imbalance, can be extracted. In another example, LODA builds on random-projection histograms from which features, such as entropy, can be extracted. In these embodiments, other meta-features, such as dispersion and maximum gap in the sorted order, may additionally be computed based on outlier scores determined by any of these algorithms.

At block 240, the process 200 involves the training engine 122 performing a UV decomposition of the performance matrix based on the training meta-feature vectors. In one example, the UV decomposition involves discounted cumulative gain ("DCG"), and the training engine 122 generates test embedded meta-feature vectors by applying an embedding function to the training meta-feature vectors. The embedding function generates an embedded meta-feature vector that has a dimensionality suitable for multiplication with a reference V matrix. The training engine 122 can use any suitable inductive embedding function, such as PCA. The training engine 122 obtains an initial U matrix having the test embedded meta-feature vectors. For instance, the training engine 122 could group the test embedded meta-feature vectors into the initial U matrix, where each row of the initial U matrix is a respective one of the test embedded meta-feature vectors.

In this example, the training engine 122 performs first iterations that modify the initial U matrix. The training engine 122 maintains an initial V matrix during the first iterations (e.g., only the U matrix, rather than the V matrix, is updated in the first iterations). The training engine 122 computes first loss values for the first iterations with a loss function or an objective function. Examples of objective functions that could be used by the training engine 122 include squared loss, Kullback-Leibler Divergence, or rank-based objective functions such as discounted cumulative gain (DCG). In the context of the performance matrix described herein, the performance of an outlier-detection program reflects a relevance of the outlier-detection program to a given training input dataset. The first loss values can indicate differences between the performance matrix and first predicted performances matrices that are constructed from the initial V matrix and U matrices outputted by the first iterations.

In some embodiments, the training engine 122 modifies the U matrix over the first iterations. In these embodiments, the training engine 122 selects a particular U matrix that is outputted by a particular one of the first iterations associated with an optimal loss value from the first loss values, such as the U matrix generated in an iteration that resulted in a lowest loss value.

In some embodiments, the matrix U used in these iterations is the selected matrix U associated with the optimal loss value during this set of second iterations. In other embodiments, the first iterations are omitted, and the training engine 122 holds the initial matrix U constant during a set of iterations in which the training engine 122 solves for V.

To solve for matrix V, the training engine 122 can compute loss values for the iterations in which the training engine 122 modifies the matrix V. The loss values can indicate differences between the performance matrix P and predicted performances matrices P that are constructed from the constant U matrix and the various V matrices outputted by a set of iterations used to solve for V. The training engine 122 selects, as a reference V matrix, a V matrix generated in one of the iterations associated with an optimal loss value from the loss values computed for these iterations. In some embodiments, the training engine 122 also modifies a parameter set for a regressor function, such that the regressor function with the modified parameter set maps the test embedded meta-feature vectors to a U matrix outputted from the UV decomposition.

In some embodiments, rather than modifying a U matrix via a set of first iterations and modifying a V matrix in a second set of iterations, the training engine 122 obtains the U matrix that includes the test embedded meta-feature vectors and uses this obtained U matrix as a constant U matrix when solving for V. In these embodiments, the training engine 122 only solves for the V matrix using a loss function. The training engine 122 uses the loss function to compute loss values for the iterations, and selects the reference V matrix having an optimal loss value.

At block 250, the process 200 involves the training engine 122 outputting the reference V matrix from the UV decomposition. For example, reference V matrix 116 can be the reference V matrix with an optimal loss value from the UV composition.

At block 260, the process 200 involves the training engine 122 generating a performance vector from a combination of a test input dataset and the reference V matrix. In some embodiments, the test input dataset is used to test the performance of the trained detector-selection program 104. For instance, the test input data could be used to test the reference V matrix, the regressor function, etc. In other embodiments, the test input dataset could be an input dataset from a user after the trained detector-selection program has been outputted for use by outlier detection software.

Figure 3:
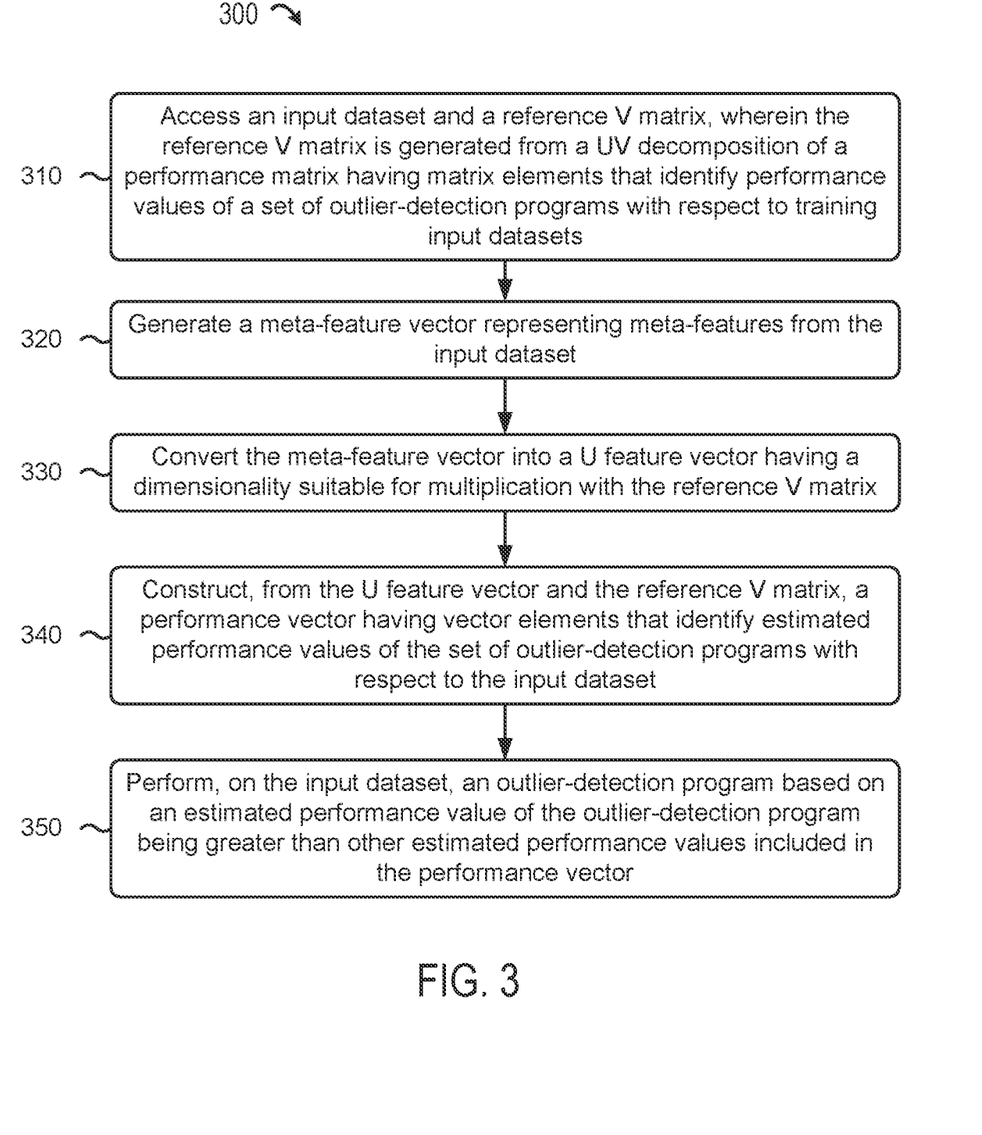
FIG. 3 depicts an example of a process for using a detector-selection program to generate and use a performance vector for selecting an outlier-detection program based on the meta-features of an input dataset, in accordance with certain embodiments described in the present disclosure.

In this manner, the training engine 122 configures a detector-selection program 104 to identify an outlier-detection program suitable to a particular input dataset. For instance, FIG. 3 depicts an example of a process 300 for using a detector-selection program to generate and use a performance vector for selecting an outlier-detection program based on the meta-features of an input dataset. One or more operations described herein with respect to the process 200 can be used to implement a step for using a performance vector to select an outlier-detection program based on meta-features of an input dataset. In some embodiments, one or more computing devices implement operations depicted in FIG. 3 by executing suitable program code (e.g., code implementing the detector-selection program 104). For illustrative purposes, the process 300 is described with reference to certain examples depicted in the figures. Other implementations, however, are possible.

At block 310, the process 300 involves the detector-selection program 104 accessing an input dataset and a reference V matrix. For instance, input dataset 114 can be the input dataset and reference V matrix 116 can be the reference V matrix. The input dataset can be a dataset without labels for outliers or other indicators in the dataset. The reference V matrix is generated from a UV decomposition of a performance matrix having matrix elements that identify performance values of a set of outlier-detection programs with respect to training input datasets. For example, the reference V matrix used at block 310 can be a reference V matrix outputted at block 250 of the process 200 described above.

At block 320, the process 300 involves the detector-selection program 104 generating a meta-feature vector representing meta-features from the input dataset. In an example involving an input data set $X_{test}$, the detector-selection program 104 generates a meta-feature vector $M_{test}$ with an extractor $\psi$ (i.e., $M_{test}=\psi(X_{test})$). The meta-feature vector is usable for determining a suitability of different outlier-detection programs for detecting outliers in the input dataset.

At block 330, the process 300 involves the detector-selection program 104 converting the meta-feature vector into a U embedding vector having a dimensionality suitable for multiplication with the reference V matrix. In some embodiments, the detector-selection program 104 converts the meta-feature vector into the U embedding vector by applying an embedding function ($\phi$) to the meta-feature function. The embedding function generates an embedded meta-feature vector with dimensionality suitable for multiplication with the reference V matrix. The detector-selection program 104 maps the embedded feature vector to the U embedding vector using a regressor function $f$. Any suitable regressor function, such as a random forest regressor, may be used. Thus, in these embodiments, the detector-selection program 104 generates a U embedding vector $U_{test}$ in which $U_{test} = f(\phi(M_{test})) = f(\phi(\varphi(X_{test})))$.

At block 340, the process 300 involves the detector-selection program 104 constructing a performance vector from the U embedding vector and the V reference vector. For instance, the detector-selection program 104 constructs a performance vector by multiplying the U embedding vector by the transpose of the reference V matrix. In this example, the performance vector $P_{test}$ for the input dataset $X_{test}$ is $P_{test} = U_{test} V^T$. The performance vector includes vector elements that identify estimated performance values of the set of outlier-detection programs with respect to the input dataset.

At block 350, the process 300 involves the detector-selection program 104 performing, on the input dataset, an outlier-detection program that is selected using the performance vector. The detector-selection program 104 can identify a outlier-detection program from the set of outlier-detection programs that has a performance value greater than the performance values for the other outlier-detection programs. For instance, the detector-selection program 104 selects the outlier-detection program $M_j \in \mathcal{M}$ for the new dataset $X_{test}$ that has the best estimated performance given by $\langle f(\phi(\psi(X_{test}))), V_j \rangle$. The detector-selection program 104 executes the selected outlier-detection program on the input dataset.

In some embodiments, a training engine 122 builds a modified performance matrix in the process 300. For example, the training engine 122 concatenates matrix elements that represent performance values with training meta-feature vectors that represent meta-features of the training input datasets. Such a modified performance matrix C could be built by concatenating a matrix P described above with a matrix M of meta-features (e.g., C=[P, M]$\in R^{n \times (m+d)}$). In the process 200, the modified performance matrix C is decomposed into a U matrix and a reference V matrix using one or more operations described above with respect to process 200 (e.g., replacing P with C in the examples discussed above).

In these embodiments, at runtime (e.g., in process 300), the detector-selection program 104 obtains, at block 330, a U embedding vector that is a meta-feature vector $M_{new}$ concatenated with a vector of zero values. The zeroes are placeholders where placement values can be filled in during computation of a performance vector. The detector-selection program 104 constructs a performance vector $\hat{P}_{new}$ from the U embedding vector and the reference V matrix by multiplying the U vector, the reference V matrix, and a transpose of the reference V matrix. This process can be represented as $[\hat{P}_{new}; \hat{M}_{new}] = [0 \ldots 0; M_{new}] V V^T$, where the detector-selection program 104 extracts $\hat{P}_{new}$ from the vector $[\hat{P}_{new}; \hat{M}_{new}]$. In particular, since the detector-selection program 104 knows the dimensionality of meta-feature vector $M_{new}$, the detector-selection program 104 can remove the $\hat{M}_{new}$ having the same dimensionality of meta-feature vector $M_{new}$ from the vector $[\hat{P}_{new}; \hat{M}_{new}]$, with the remaining vector elements forming the performance vector $\hat{P}_{new}$.

Example of a Computing System for Implementing Certain Embodiments

Figure 4:
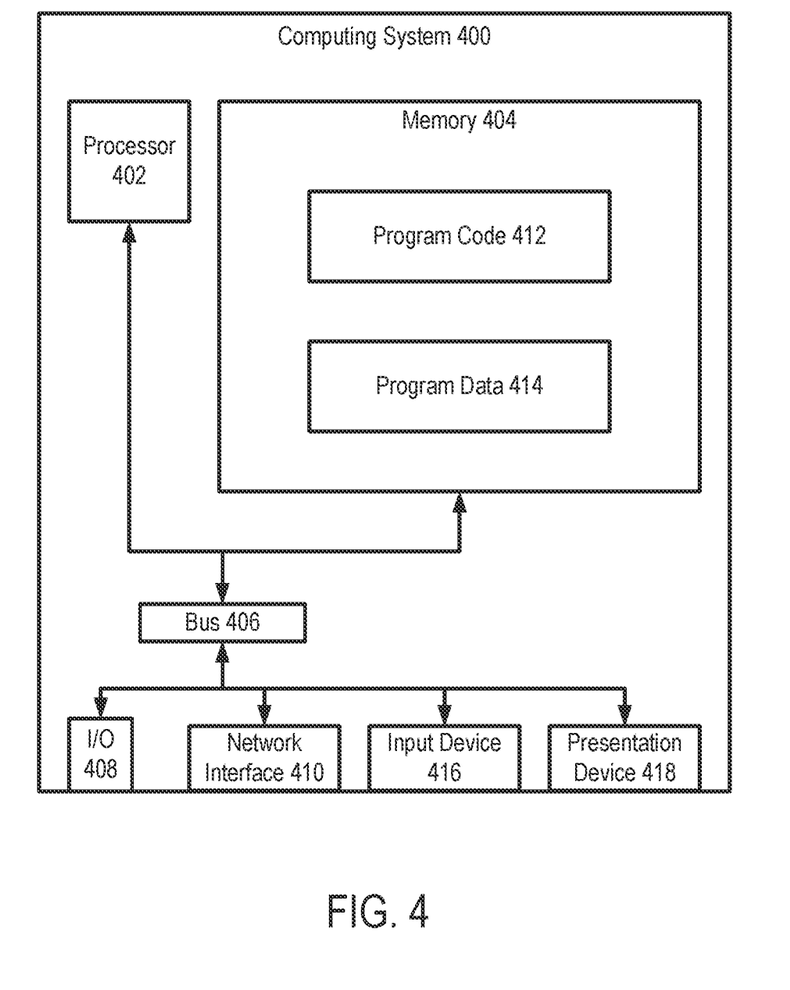
FIG. 4 depicts an example of a computing system suitable for implementing certain embodiments described herein.

Any suitable computing system or group of computing systems can be used for performing the operations described herein. For example, FIG. 4 depicts an example of the computing system 400. The implementation of computing system 400 could be used for one or more of a dataset-processing system 102, a user device 118, and a training system 120. In other embodiments, a single computing system 400 having devices similar to those depicted in FIG. 4 (e.g., a processor, a memory, etc.) combines the one or more operations and data stores depicted as separate systems in FIG. 1.

The depicted example of a computing system 400 includes a processor 402 communicatively coupled to one or more memory devices 404. The processor 402 executes computer-executable program code stored in a memory device 404, accesses information stored in the memory device 404, or both. Examples of the processor 402 include a microprocessor, an application-specific integrated circuit ("ASIC"), a field-programmable gate array ("FPGA"), or any other suitable processing device. The processor 402 can include any number of processing devices, including a single processing device.

A memory device 404 includes any suitable non-transitory computer-readable medium for storing program code 412, program data 414, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 400 may also include a number of external or internal devices, an input device 416, a presentation device 418, or other input or output devices. For example, the computing system 400 is shown with one or more input/output ("I/O") interfaces 408. An I/O interface 408 can receive input from input devices or provide output to output devices. One or more buses 406 are also included in the computing system 400. The bus 406 communicatively couples one or more components of a respective one of the computing system 400.

The computing system 400 executes program code 412 that configures the processor 402 to perform one or more of the operations described herein. Examples of the program code 412 include, in various embodiments, algorithms executed by the dataset-processing system 102 (e.g., functions of the detector-selection program 104), the user interface engine 106, the training engine 122, or other suitable applications that perform one or more operations described herein. The program code may be resident in the memory device 404 or any suitable computer-readable medium and may be executed by the processor 402 or any other suitable processor.

In some embodiments, one or more memory devices 404 store program data 414 that includes one or more datasets and models described herein. Examples of these datasets include interaction data, training data, and/or parameter values. In some embodiments, one or more of data sets, models, and functions are stored in the same memory device (e.g., one of the memory devices 404). In additional or alternative embodiments, one or more of the programs, data sets, models, and functions described herein are stored in different memory devices 404 accessible via a data network.

In some embodiments, the computing system 400 also includes a network interface device 410. The network interface device 410 includes any device or group of devices suitable for establishing a wired or wireless data connection to one or more data networks. Non-limiting examples of the network interface device 410 include an Ethernet network adapter, a modem, and/or the like. The computing system 400 is able to communicate with one or more other computing devices (e.g., a user device) via a data network using the network interface device 410.

In some embodiments, the computing system 400 also includes the input device 416 and the presentation device 418 depicted in FIG. 4. An input device 416 can include any device or group of devices suitable for receiving visual, auditory, or other suitable input that controls or affects the operations of the processor 402. Non-limiting examples of the input device 416 include a touchscreen, a mouse, a keyboard, a microphone, and/or a separate mobile computing device. A presentation device 418 can include any device or group of devices suitable for providing visual, auditory, or other suitable sensory output. Non-limiting examples of the presentation device 418 include a touchscreen, a monitor, a speaker, and/or a separate mobile computing device.

Although FIG. 4 depicts the input device 416 and the presentation device 418 as being local to the computing device that executes the dataset-processing system 102, other implementations are possible. For instance, in some embodiments, one or more of the input device 416 and the presentation device 418 can include a remote client-computing device that communicates with the computing system 400 via the network interface device 410 using one or more data networks described herein.

General Considerations

While the present subject matter has been described in detail with respect to specific embodiments thereof, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The invention claimed is:

1. A method in which processing hardware performs operations for selecting which outlier-detection program to execute on an input dataset, the operations comprising:
   accessing the input dataset and a reference V matrix, wherein the reference V matrix is generated from a UV decomposition of a performance matrix having matrix elements that identify performance values of a set of outlier-detection programs with respect to training input datasets;
   selecting which outlier-detection program to execute on the input dataset by:
      generating a meta-feature vector representing meta-features from the input dataset;
      converting the meta-feature vector into a U embedding vector having a dimensionality suitable for multiplication with the reference V matrix;
      constructing, from the U embedding vector and the reference V matrix, a performance vector having vector elements that identify estimated performance values of the set of outlier-detection programs with respect to the input dataset; and
      selecting an outlier-detection program from among the set of outlier-detection programs based on an estimated performance value of the outlier-detection program being greater than other estimated performance values included in the performance vector; and
   executing, on the input dataset, the selected outlier-detection program to identify one or more outliers associated with the input dataset.

2. The method of claim 1, wherein converting the meta-feature vector into the U embedding vector comprises:
applying, to the meta-feature vector, an embedding function that generates an embedded meta-feature vector having the dimensionality suitable for multiplication with the reference V matrix; and
mapping, via a regressor function, the embedded meta-feature vector to the U embedding vector.

3. The method of claim 2, the operations further comprising, prior to accessing the input dataset, a training process comprising:
generating the performance matrix by performing each outlier-detection program on the training input datasets;
performing the UV decomposition to generate a U matrix and the reference V matrix;
generating test embedded meta-feature vectors by, at least, applying the embedding function to training meta-feature vectors extracted from the training input datasets, respectively; and
modifying a parameter set for the regressor function such that the regressor function with the modified parameter set maps the test embedded meta-feature vectors to the U matrix.

4. The method of claim 3, wherein performing the UV decomposition to generate the U matrix and the reference V matrix comprises:
obtaining an initial U matrix that includes the test embedded meta-feature vectors;
performing first iterations that modify the initial U matrix, wherein an initial V matrix is constant during the first iterations;
computing, with a loss function, first loss values for the first iterations, wherein the first loss values indicate differences between the performance matrix and first predicted performances matrices, the first predicted performances matrices constructed from the initial V matrix and U matrices outputted by the first iterations;
selecting the U matrix based on the U matrix being outputted by one of the first iterations associated with an optimal loss value from the first loss values;
performing second iterations that modify the initial V matrix, wherein the selected U matrix is constant during the second iterations;
computing, with the loss function, second loss values for the second iterations, wherein the second loss values indicate differences between the performance matrix and second predicted performances matrices, the second predicted performances matrices constructed from the selected U matrix and V matrices outputted by the second iterations;
selecting the reference V matrix based on the reference V matrix being outputted by one of the second iterations associated with an optimal loss value from the second loss values; and
outputting the U matrix and the reference V matrix.

5. The method of claim 3, wherein performing the UV decomposition to generate the U matrix and the reference V matrix comprises:
obtaining an initial U matrix that includes the test embedded meta-feature vectors;
performing first iterations that modify the initial U matrix, wherein an initial V matrix is constant during the first iterations;
computing, with a loss function, first loss values for the first iterations, wherein the first loss values indicate differences between the performance matrix and first predicted performances matrices, the first predicted performances matrices constructed from the initial V matrix and U matrices outputted by the first iterations;
selecting the U matrix based on the U matrix being outputted by one of the first iterations associated with an optimal loss value from the first loss values;
performing second iterations that modify the initial V matrix, wherein the selected U matrix is constant during the second iterations;
computing, with the loss function, second loss values for the second iterations, wherein the second loss values indicate differences between the performance matrix and second predicted performances matrices, the second predicted performances matrices constructed from the selected U matrix and V matrices outputted by the second iterations; and
selecting the reference V matrix based on the reference V matrix being outputted by one of the second iterations associated with an optimal loss value from the second loss values.

6. The method of claim 1, wherein:
the performance matrix includes the matrix elements concatenated with training meta-feature vectors representing meta-features of the training input datasets;
converting the meta-feature vector into the U embedding vector comprises concatenating the meta-feature vector with a vector consisting of zero values; and
constructing the performance vector from the U embedding vector and the reference V matrix comprises multiplying the U embedding vector, the reference V matrix, and a transpose of the reference V matrix.

7. The method of claim 1, the operations further comprising, prior to accessing the input dataset, a training process comprising:
generating the performance matrix by performing each outlier-detection program on the training input datasets;
generating test embedded meta-feature vectors by, at least, applying an embedding function to training meta-feature vectors extracted from the training input datasets, respectively;
obtaining a U matrix that includes the test embedded meta-feature vectors;
performing iterations that modify an initial V matrix, wherein the U matrix having the test embedded meta-feature vectors is constant during the iterations;
computing, with a loss function, loss values for the iterations, wherein the loss values indicate differences between the performance matrix and predicted performances matrices, the predicted performances matrices constructed from the U matrix and V matrices outputted by the iterations; and
selecting the reference V matrix based on the reference V matrix being outputted by one of the iterations associated with an optimal loss value from the loss values.

8. A method in which processing hardware performs operations for selecting which outlier-detection program to execute on an input dataset, the operations comprising:
generating a reference V matrix by:
accessing training input datasets and a set of outlier-detection programs;
generating a performance matrix by performing each outlier-detection program on the training input datasets, wherein the performance matrix includes matrix elements that identify performance values of the set of outlier-detection programs with respect to the training input datasets;

generating training meta-feature vectors representing meta-features of the training input datasets; and performing, based on the training meta-feature vectors, a UV decomposition of the performance matrix to generate the reference V matrix;

selecting which outlier-detection program to execute on the input dataset by:

generating a performance vector based on the input dataset and the reference V matrix; and selecting an outlier-detection program from among the set of outlier-detection programs based on an estimated performance value of the outlier-detection program in the performance vector; and outputting an indication of the selected outlier-detection program.

9. The method of claim 8, wherein performing the UV decomposition comprises:

generating test embedded meta-feature vectors by, at least, applying an embedding function to the training meta-feature vectors, wherein the embedding function that generates an embedded meta-feature vector having a dimensionality suitable for multiplication with the reference V matrix;

obtaining an initial U matrix that includes the test embedded meta-feature vectors;

performing first iterations that modify the initial U matrix, wherein an initial V matrix is constant during the first iterations;

computing, with a loss function, first loss values for the first iterations, wherein the first loss values indicate differences between the performance matrix and first predicted performances matrices, the first predicted performances matrices constructed from the initial V matrix and U matrices outputted by the first iterations;

selecting the U matrix based on the U matrix being outputted by one of the first iterations associated with an optimal loss value from the first loss values;

performing second iterations that modify the initial V matrix, wherein the selected U matrix is constant during the second iterations;

computing, with the loss function, second loss values for the second iterations, wherein the second loss values indicate differences between the performance matrix and second predicted performances matrices, the second predicted performances matrices constructed from the selected U matrix and V matrices outputted by the second iterations; and selecting the reference V matrix based on the reference V matrix being outputted by one of the second iterations associated with an optimal loss value from the second loss values.

10. The method of claim 9, the operations further comprising modifying a parameter set for a regressor function such that the regressor function with the modified parameter set maps the test embedded meta-feature vectors to a U matrix outputted from the UV decomposition.

11. The method of claim 8, wherein performing the UV decomposition to generate a U matrix and the reference V matrix comprises:

generating test embedded meta-feature vectors by, at least, applying an embedding function to the training meta-feature vectors, wherein the embedding function that generates an embedded meta-feature vector having a lower dimensionality than a meta-feature matrix of the training meta-feature vectors;

obtaining a U matrix that includes the test embedded meta-feature vectors;

performing iterations that modify an initial V matrix, wherein the U matrix having the test embedded meta-feature vectors is constant during the iterations;

computing, with a loss function, loss values for the iterations, wherein the loss values indicate differences between the performance matrix and predicted performances matrices, the predicted performances matrices constructed from the U matrix and V matrices outputted by the iterations; and selecting the reference V matrix based on the reference V matrix being outputted by one of the iterations associated with an optimal loss value from the loss values.

12. A system comprising:

processing hardware; and a non-transitory computer-readable medium communicatively coupled to the processing hardware, wherein the processing hardware is configured for executing program code stored on the non-transitory computer-readable medium and thereby performing operations comprising:

accessing an input dataset;

a step for using a performance vector to select an outlier-detection program from among a set of outlier-detection programs based on meta-features of the input dataset, wherein the step comprises:

accessing a reference V matrix;

constructing the performance vector based on the reference V matrix and the input dataset, the performance vector having vector elements indicating estimated performance values of the set of outlier-detection programs with respect to the input dataset;

selecting the outlier-detection program based on an estimated performance value of the outlier-detection program in the performance vector; and performing the selected outlier-detection program on the input dataset.

13. The system of claim 12, wherein the reference V matrix is generated from a UV decomposition of a performance matrix having matrix elements that identify performance values of the set of outlier-detection programs with respect to training input datasets, and wherein the step for using the performance vector to select the outlier-detection program based on the meta-features of the input dataset comprises:

generating a meta-feature vector representing the meta-features from the input dataset;

converting the meta-feature vector into a U embedding vector having a dimensionality suitable for multiplication with the reference V matrix;

constructing, from the U embedding vector and the reference V matrix, the performance vector; and selecting the outlier-detection program based on the estimated performance value of the outlier-detection program being greater than other estimated performance values included in the performance vector.

14. The system of claim 13, wherein the step for using the performance vector to select the outlier-detection program based on the meta-features of the input dataset further comprises:

generating the performance matrix by performing each outlier-detection program on the training input datasets;

generating test embedded meta-feature vectors by, at least, applying an embedding function to training meta-feature vectors extracted from the training input datasets, respectively;

obtaining a U matrix that includes the test embedded meta-feature vectors;

performing iterations that modify an initial V matrix, wherein the U matrix having the test embedded meta-feature vectors is constant during the iterations;

computing, with a loss function, loss values for the iterations, wherein the loss values indicate differences between the performance matrix and predicted performances matrices, the predicted performances matrices constructed from the U matrix and V matrices outputted by the iterations; and selecting the reference V matrix based on the reference V matrix being outputted by one of the iterations associated with an optimal loss value from the loss values.

15. The system of claim 13, wherein converting the meta-feature vector into the U embedding vector comprises:

applying, to the meta-feature vector, an embedding function that generates an embedded meta-feature vector having the dimensionality suitable for multiplication with the reference V matrix; and mapping, via a regressor function, the embedded meta-feature vector to the U embedding vector.

16. The system of claim 13, wherein:

the performance matrix includes the matrix elements concatenated with training meta-feature vectors representing meta-features of the training input datasets;

converting the meta-feature vector into the U embedding vector comprises concatenating the meta-feature vector with a vector consisting of zero values; and constructing the performance vector from the U embedding vector and the reference V matrix comprises multiplying the U embedding vector, the reference V matrix, and a transpose of the reference V matrix.

17. The system of claim 12, wherein the step for using the performance vector to select the outlier-detection program based on the meta-features of the input dataset comprises:

accessing training input datasets and the set of outlier-detection programs;

generating a performance matrix by performing each outlier-detection program on the training input datasets, wherein the performance matrix includes matrix elements that identify performance values of the set of outlier-detection programs with respect to the training input datasets;

generating training meta-feature vectors representing meta-features of the training input datasets;

performing, based on the training meta-feature vectors, a UV decomposition of the performance matrix;

outputting, from the UV decomposition, the reference V matrix; and generating the performance vector from a combination of the input dataset and the reference V matrix.

18. The system of claim 17, wherein performing the UV decomposition comprises:

generating test embedded meta-feature vectors by, at least, applying an embedding function to the training meta-feature vectors, wherein the embedding function that generates an embedded meta-feature vector having a dimensionality suitable for multiplication with the reference V matrix;

obtaining an initial U matrix that includes the test embedded meta-feature vectors;

performing first iterations that modify the initial U matrix, wherein an initial V matrix is constant during the first iterations;

computing, with a loss function, first loss values for the first iterations, wherein the first loss values indicate differences between the performance matrix and first predicted performances matrices, the first predicted performances matrices constructed from the initial V matrix and U matrices outputted by the first iterations;

selecting the U matrix based on the U matrix being outputted by one of the first iterations associated with an optimal loss value from the first loss values;

performing second iterations that modify the initial V matrix, wherein the selected U matrix is constant during the second iterations;

computing, with the loss function, second loss values for the second iterations, wherein the second loss values indicate differences between the performance matrix and second predicted performances matrices, the second predicted performances matrices constructed from the selected U matrix and V matrices outputted by the second iterations; and selecting the reference V matrix based on the reference V matrix being outputted by one of the second iterations associated with an optimal loss value from the second loss values.

19. The system of claim 18, the operations further comprising modifying a parameter set for a regressor function such that the regressor function with the modified parameter set maps the test embedded meta-feature vectors to a U matrix outputted from the UV decomposition.

20. The system of claim 17, wherein performing the UV decomposition to generate a U matrix and the reference V matrix comprises:

generating test embedded meta-feature vectors by, at least, applying an embedding function to the training meta-feature vectors, wherein the embedding function that generates an embedded meta-feature vector having a lower dimensionality than a meta-feature matrix of the training meta-feature vectors;

obtaining a U matrix that includes the test embedded meta-feature vectors;

performing iterations that modify an initial V matrix, wherein the U matrix having the test embedded meta-feature vectors is constant during the iterations;

computing, with a loss function, loss values for the iterations, wherein the loss values indicate differences between the performance matrix and predicted performances matrices, the predicted performances matrices constructed from the U matrix and V matrices outputted by the iterations; and selecting the reference V matrix based on the reference V matrix being outputted by one of the iterations associated with an optimal loss value from the loss values.

* * * * *